United States Patent Office 3,080,316
Patented Mar. 5, 1963

3,080,316
FIRE RETARDANT AND CONTROL
COMPOSITION
Sidney V. Petertyl, Santa Barbara, Calif., and Donald W. Davis, Clinton Township, N.J., assignors to Johns-Manville Corporation, New York, N.Y., a corporation of New York
No Drawing. Filed Sept. 15, 1958, Ser. No. 761,268
15 Claims. (Cl. 252—2)

This invention relates to preparations for, and a method of retarding and controlling fires, and is particularly directed to a novel combination which produces an adhering, liquid retaining, smothering and insulating blanket.

Non-combustible liquids have typically been utilized as fire extinguishing media due, primarily, to their ready availability, particularly in the case of water, their ease and efficiency of handling and application or employment, their ability to penetrate, wet or saturate, and extinguish by smothering as well as cooling by evaporation. Non-liquid fire extinguishing media such as non-combustible powders or granular material, though more efficient and practical extinguishing means in certain limited situations, are not generally utilized because of inherent difficulties in transporting and applying or employing the same and their ineffectiveness against burning structures due to their inability to adhere and therefore extinguish combustion on vertical or the under side of horizontal surfaces. However, both liquid and non-liquid fire extinguishing media such as water and sand or the like gravitate or flow which comprises a serious inherent disadvantage when the source of a fire is in an elevated position. Further, conventional fire extinguishing media, particularly water, chemicals or the like normally damage or destroy the objects saved from combustion by these agents.

Numerous fire extinguishing or controlling materials or products such as gases, foams, chemical solutions or dispersions, etc., have been proposed and/or utilized to improve upon or overcome the obvious and inherent deficiencies of conventional materials such as water and sand or the like. Nevertheless such materials or products, although many comprise substantial improvements in certain instances over water and sand, etc., normally suffer from one or more material deficiencies, e.g., are subject to gravitation or flow, readily evaporate, destructive to contacting or adjacent materials, injurious or toxic to animal and plant life, or expensive, among other disadvantages.

Accordingly, it is an object of this invention to provide a novel fire retardant and control preparation which does not gravitate or flow but blankets or coats by adhering tenaciously upon contact to substantially any surface, including vertical structures and the under side of horizontal surfaces such as ceilings, without running or dripping to the point of exposing the coated surface. Moreover, it is an object that notwithstanding its ability to cling firmly to substantially any surface and resist gravity, the preparation may be conveniently removed from said surfaces by vacuum, peeled off in strips or washed away with a strong fluid stream.

It is a further object of this invention to provide a sprayable preparation which upon contact readily forms an adhering insulation and smothering blanket or coating which does not boil (crater), bubble, or spall exposing any underlying combustible surface when a wet blanket or coating of the same is subjected to a direct flame and brought to dull red heat.

It is a further object of this invention to provide a fire retarding and controlling preparation which is readily wettable and dispersible and thereby quickly and easily mixed, can be stored in tanks or fire extinguishers for long periods without settling or separation of the components, is readily pumpable, and is not excessively abrasive to pumps, conduits or the like.

It is a further object of this invention to provide a sprayable preparation which readily forms an adhering insulating and smothering blanket or coating which retards evaporation of fire extinguishing liquids at elevated temperatures, may be re-wetted or re-charged in situ to compensate for evaporation by applying a spray of liquid, is not toxic or otherwise injurious to soil, animal or vegetable life, and is an efficient and effective thermal insulation.

A still further object of this invention is to provide a fire retarding and controlling preparation which is especially adaptable and efficient for aerial dropping in the combatting and controlling of forest and brush fires in that it has a low weight per gallon or low specific gravity and low volume increase per gallon, neither sterilizes the soil nor is toxic or injurious to plant and animal life, resists run-off and evaporation or drying due to high temperatures or the absorbency of the ground or other contacting surfaces and provides an effective thermal insulation which adheres to substantially any contacting surface.

This invention will be more fully understood and further objects and advantages thereof will become apparent from the hereinafter detailed description.

According to the present invention the fire extinguishing, retarding and controlling properties of typical liquid fire extinguishing media, particularly water, can be greatly enhanced and new and advantageous properties imparted thereto by dispersing and/or dissolving therein relatively small quantities, i.e., about 8 to 20 lbs. per 100 lbs. of the liquid slurry, of a preparation comprising a combination including a major portion of a highly absorbent particulate mineral and a minor portion of a temperature insensitive suspending and thickening agent. The preparation or combination preferably also includes small amounts of an auxiliary but not necessarily temperature insensitive suspending and thickening agent to obtain optimum handling, storage and application characteristics.

The particulate mineral absorbent carrier of the combination may comprise substantially any "inert" granular or powdered mineral sized less than approximately 100 mesh which exhibits a Gardner-Coleman water absorption of at least approximately 50%. Suitable mineral carriers may comprise, for example, calcium silicates, magnesium silicates, diatomaceous earth, certain clays or the like, and in general the higher the absorption capacity of the mineral the more efficient the preparation. Hydrated calcium silicates, which may have water absorption capacities up to approximately 500% of their weight, comprise the preferred mineral carrier; however, the low cost of diatomaceous earth and some clays as compared to calcium silicates render the former desirable primarily for reasons of economy. The mineral absorbent carrier component of the combination should comprise approximately 70 to 95% by weight of the preparation, depending, of course, upon the absorptive properties of the particular mineral utilized. Generally, approximately 85% (that is, about 82 to 88%) by weight of the absorbent mineral is preferred, for example, approximately 87.5% for highly absorbent calcium silicates and approximately 82.5% for a typical diatomaceous earth.

It is essential that the viscosity of the gelled liquid preparation is not substantially reduced at elevated or flame temperatures, and preparations of this invention therefore must include a substantial or effective amount of a primary suspending and thickening agent which is not susceptible to loss of imparted viscosity or gelling upon exposure to temperature increases. Suspending and thickening agents found to fulfill the requirement of maintaining, or increasing the imparted viscosity of gelled liquids at elevated or flame temperatures include methylcellulose such as dimethyl ethers of cellulose or mixed hydroxypropyl and methyl ethers of cellulose (for example, Dow Chemical Company's "Methocel MC" or "Methocel HG") and the gel-forming members of the montmorillonite group of minerals. Normally the viscosity of solutions containing typical suspending and thickening agents decreases when the temperature is increased; however, increasing the temperature of methylcellulose-containing solutions results in an initial slight decrease in viscosity followed by an abrupt and substantial increase producing gelatinization of the solution or slurry, and, in the instant application, the viscosity of the bentonite or the like gel-forming clay-containing slurry is substantially unaffected by contemplated temperature changes. Accordingly, although methylcellulose does in fact exhibit some temperature induced changes in viscosity, a slight or moderate decrease followed by a substantial increase, for the purpose of delineating and claiming this invention the expression "temperature insensitive suspending and thickening agent" has been arbitrarily designated to describe and define not only those suspending and thickening materials which are substantially unaffected by contemplated temperature changes but also those which are not detrimentally influenced by temperature changes, i.e., those which exhibit a substantial or material increase, but not decrease, in viscosity as the ambient temperature increases, and therefore fulfill the requisite needs in the novel combination or preparation of this invention. Moreover, it is to be noted that it is this particular property, viz., substantial temperature insensitivity insofar as imparted viscosity is concerned or providing a solution or slurry which is not susceptible to material or detrimental decreases in viscosity upon exposure to temperature increases, which is common to both methylcellulose and the gel-forming members of the montmorillonite group of minerals and is primarily responsible for their function in the combination or preparation of this invention and distinguishes them from other conventional suspending and thickening agents. These primary or temperature insensitive suspending and thickening agents should be included in the combination in amounts of from approximately 1 to 25 parts by weight, preferably approximately 1.5 parts by weight of methylcellulose or 10 parts by weight of a gel-forming member of the montmorillonite group of minerals.

Preferably, the combination or preparation also includes relatively small amounts of an auxiliary suspending and thickening agent, i.e., one which need not exhibit temperature insensitive viscosity imparting properties, to improve upon or augment the preparing, storing, handling and application characteristics of the liquid preparation. Suitable materials comprise conventional water soluble, organic, polymeric suspending and thickening agents, such, for example, as polyacrylamides, hydroxyethyl cellulose, polyethylene oxide polymer, sodium carboxymethlcellulose and carboxymethylhydroxyethylcellulose. Accordingly, small amounts, i.e., approximately 0.1 to 10 parts by weight of the combination or preparation, of these auxiliary suspending and thickening agents normally are desirable included in the combination or utilized to adjust or refine the optimum properties.

For certain applications it may be desirable or appropriate to include mineral reinforcing fiber such as asbestos in addition to or in place of the auxiliary suspending and thickening agent. Reinforcing fiber materially strengthens the resulting coating or blanket when a liquid slurry of the combination contacts a surface; however, fiber may impede some types of pumps, e.g., foul the impeller vanes, etc. Accordingly, reinforcing fiber may comprise an advantageous and beneficial component in certain applications provided, of course, it can be effectively pumped or otherwise handled and applied. When applicable, fiber may be included in amounts up to approximately 15 parts by weight of the combination.

Adhering, insulating and blanket forming slurries exhibiting highly efficient and effective fire combatting and controlling properties may be prepared simply by adding or dispersing the foregoing preparation or combination of ingredients to or in a conventional flowable liquid fire extinguishing media such as water. The fire retarding and controlling preparations should comprise about 8 to 20 lbs. of said combination per 100 lbs. of slurry, or about ½ to 2 lbs. of the combination per gallon of water.

The combination or preparation may, of course, include other compatible components or ingredients which impart or provide obviously appropriate or desirable properties and characteristics. For example, wetting and/or dispersing agents to improve mixing, pH adjusting or maintaining additives or materials, bactericides and/or fungicides, etc., may be included when necessary or desired, provided the particular additive is compatible with the balance of the system. A suitable wetting and dispersing agent is illustrated by alkylnaphthalene sodium sulfonate, commercially available as Du Pont's Alkanol B and efficient pH raising or alkali imparting components may comprise sodium carbonate and/or calcium silicates.

The following examples illustrate suitable fire retarding and control preparations or combinations, all components being in parts by weight. It is to be understood that the various compositions of the preparations given are exemplary and are not to be construed to limit the invention to the particular components or their proportions specified in the hereinafter examples. The relative proportions of all components of the following exemplary formulations are given in parts by weight unless otherwise specified.

*Example I*

| | |
|---|---:|
| Calcium silicate | 87.6 |
| Bentonite | 10.0 |
| Sodium carboxymethylcellulose (Hercules Cellulose Gum 7 H) | 1.7 |
| Wetting and dispersing agent (alkylnaphthalene sodium sulfonate) | 0.7 |

An aqueous slurry containing the foregoing combination in a 10.3% solids content exhibited good flow and coating properties and negligible settling in six months.

A fire test was devised to evaluate the retardant properties of the foregoing formulation and compare it with conventional fire retardants. The test comprised dipping tongue depressors into the retardant slurry or solution and immediately placing the same in a muffle furnace held at 1100 to 1200° F. The length of time required until a flame appeared was noted. Tongue blades soaked in water for 30 minutes were used as a control.

| Treatment: | Average time to ignite (seconds) |
|---|---:|
| Water | 67 |
| Standard sodium calcium borate fire retardant solution (4 lbs./gal. water) | 148 |
| Formulation of Example I (aqueous slurry of 10.3% solids) | 180+ |

No ignition occurred with the formulation of Example I; the wood charred under the retardant comprising the formulation of Example I but did not burst into flame.

*Example II*

| | |
|---|---:|
| Diatomaceous earth | 82.5 |
| Bentonite | 10.0 |
| Sodium carboxymethylcellulose (Hercules Cellulose Gum 7 H) | 1.0 |
| Wetting and dispersing agent (alkylnaphthalene sodium sulfonate) | 0.5 |
| Alkali pH regulating ingredients | 6.0 |
| (Sodium carbonate (58%)—2.0 parts.) | |
| (Calcium silicate—4.0 parts.) | |

The acid pH of the diatomite based formulations should be raised to reduce its corrosive characteristics and as illustrated in the foregoing example a compatible alkaline material may be included in the combination to increase pH. A slurry of the diatomite based formulation of Example II containing 15.2% solids exhibited comparable fire retardant properties to the four pounds per gal. sodium calcium borate aqueous suspension.

*Example III*

| | |
|---|---|
| Calcium silicate | 88.0 |
| Methylcellulose ether (Dow "Methocel MC") | 3.0 |
| Asbestos fiber (pulverized) | 9.0 |

This asbestos fiber containing formulation was prepared as an aqueous slurry containing about 10% solids.

Additional suitable exemplary preparations or combinations may comprise the following in the approximate parts by weight indicated:

*Example IV*

| | |
|---|---|
| Calcium silicate | 82.0–94.3 |
| Bentonite | 5.0–15.0 |
| Sodium carboxymethylcellulose | 0.5–2.0 |
| Alkylnaphthalene sodium sulfonate | 0.2–1.0 |

*Example V*

| | |
|---|---|
| Diatomaceous earth | 72.0–90.3 |
| Bentonite | 5.0–15.0 |
| Sodium carboxymethylcellulose | 0.5–2.0 |
| Alkylnaphthalene sodium sulfonate | 0.1–1.0 |
| pH regulating ingredient | 4.0–10.0 |

*Example VI*

| | |
|---|---|
| Mineral filler clay (attapulgite, kaloinite or pyrophlite) | 72.0–90.3 |
| Bentonite | 5.0–15.0 |
| Sodium carboxymethylcellulose | 0.5–2.0 |
| Alkylnaphthalene sodium sulfonate | 0.2–1.0 |

*Example VII*

| | |
|---|---|
| Calcium silicate | 80.0–93.5 |
| Methylcellulose | 1.5–5.0 |
| Asbestos fiber | 5.0–15.0 |

The fire retardant and control preparation of combination of this invention is particularly useful and intended for combatting forest and brush fires and is especially adaptable for aerial dropping from tanker aircraft. For example, the preparation is typically combined with water in a ratio of approximately 1 lb. per gal. and results in a slurry having a specific gravity of about 1.10 whereas the now conventional or standard chemical fire retardant for aerial dropping or combatting of forest fires, a sodium calcium borate suspension, is combined with water in a ratio of approximately 4 lbs. per gal. and has a specific gravity of approximately 1.22. Moreover, the standard sodium calcium borate solution is a soil sterilent while the instant preparation does not contain any components deleterious to the soil, plant or animal life, and of particular significance, the abrasiveness of the preparation of this invention is substantially less than that of the standard sodium calcium borate solution. Comparative tests, comprising recirculating a slurry of a fire retardant and control preparation through a pump until failure due to wear, run with a standard sodium calcium borate chemical fire retardant suspension and calcium silicate and diatomaceous earth based slurries prepared in accordance with the preferred formulations of this invention, demonstrated their relative abrasiveness. Each slurry was prepared at a consistency to give a 1/16 to 1/8 dip coating and was recirculated through an Eco PP-1M pump at a discharge pressure of 100 p.s.i.g. until the pumps were so worn that flow ceased. The following pumping times were measured and the amount of wear was equivalent in all cases.

| Sample: | Time to failure (minutes) |
|---|---|
| Calcium silicate based formulation of Example I | 60 |
| Diatomaceous earth based formulation of Example II | 56 |
| Sodium calcium borate based formulation | 20 |

Thus, it is readily apparent from the foregoing data that relatively low specific gravity or weight per gal., reduced pump abrasion and innocuous properties insofar as soil, plant and animal life renders the preparations of this invention particularly adaptable and useful in combatting forest and brush fires by aerial application from tanker aircraft.

It should be understood that the present disclosure is for the purpose of illustration only and that this invention includes all modifications and equivalents which fall within the scope of the appended claims.

What we claim is:

1. A composition for imparting new and enhanced fire retarding and control properties to flowable liquid fire extinguishing media which consists essentially of the combination of approximately 70 to 95 parts by weight of particulate absorbent mineral material having a Gardner-Coleman water absorption of at least 50% by weight selected from the group consisting of calcium silicate, magnesium silicate, diatomaceous earth, attapulgite, kaolinite, and pyrophyllite, and mixtures thereof, together with approximately 1 to 25 parts by weight of thickening agent selected from the group consisting of methylcellulose and gel-forming bentonite, and mixtures thereof.

2. The composition of claim 1 containing asbestos fiber in amount up to approximately 15 parts by weight.

3. A fire retardant and control composition consisting of an adhering aqueous dispersion of about 8 to 20 pounds per 100 pounds of slurry of the combination consisting essentially of approximately 70 to 95 parts by weight of particulate absorbent mineral material having a Gardner-Coleman water absorption of at least 50% by weight, selected from the group consisting of calcium silicate, magnesium silicate, diatomaceous earth, attapulgite, kaolinite, and pyrophyllite, and mixtures thereof, together with approximately 1 to 25 parts by weight of thickening agent selected from the group consisting of methylcellulose and gel-forming bentonite, and mixtures thereof.

4. The composition of claim 3 containing asbestos fiber in amount up to approximately 15 parts by weight.

5. An improved method of retarding and controlling fires which comprises applying to exposed combustible surfaces an adhering, water retaining, smothering and insulating, blanketing coating of an aqueous slurry of about 8 to 20 pounds per 100 pounds of slurry of the combination consisting essentially of approximately 70 to 95 parts by weight of particulate absorbent mineral material having a Gardner-Coleman water absorption of at least 50% by weight selected from the group consisting of calcium silicate, magnesium silicate, diatomaceous earth, attapulgite, kaolinite, and pyrophyllite, and mixtures thereof, together with approximately 1 to 25 parts by weight of thickening agent selected from the group consisting of methylcellulose and gel-forming bentonite, and mixtures thereof.

6. The method of claim 5 wherein the combination of the slurry contains asbestos fiber in amount up to approximately 15 parts by weight.

7. A composition for imparting new and enhanced fire retarding and controlling properties to liquid fire extinguishing media consisting essentially of the combination of approximately 82 to 94.5 parts by weight of particulate absorbent calcium silicate having a Gardner-Coleman water absorption of at least 50% by weight, approximately 5 to 15 parts by weight of gel-forming bentonite, and approximately 0.5 to 2 parts by weight of methylcellulose.

8. A fire retardant and control composition consisting of an adhering aqueous dispersion of about 8 to 20 pounds per 100 pounds of slurry of the combination consisting essentially of approximately 82 to 94.5 parts by weight of particulate absorbent calcium silicate having a Gardner-Coleman water absorption of at least 50% by weight, approximately 5 to 15 parts by weight of gel-forming bentonite, and approximately 0.5 to 2 parts by weight of methylcellulose.

9. A composition for imparting new and enhanced fire retarding and control properties to liquid fire extinguishing media consisting essentially of the combination of approximately 72 to 90.3 parts by weight of particulate absorbent diatomaceous earth having a Gardner-Coleman water absorption of at least 50% by weight, approximately 5 to 15 parts by weight of gel-forming bentonite, and approximately 0.5 to 2 parts by weight of methylcellulose.

10. A fire retardant and control composition consisting of an adhering aqueous dispersion of about 8 to 20 pounds per 100 pounds of slurry of the combination consisting essentially of approximately 72 to 90.3 parts by weight of particulate absorbent diatomaceous earth having a Gardner-Coleman water absorption of at least 50% by weight, approximately 5 to 15 parts by weight of gel-forming bentonite, and approximately 0.5 to 2 parts by weight of methylcellulose.

11. A composition for imparting new and enhanced fire retarding and controlling properties to liquid fire extinguishing media consisting essentially of the combination of approximately 80 to 93.5 parts by weight of particulate absorbent calcium silicate having a Gardner-Coleman water absorption of at least 50% by weight, approximately 1.5 to 5 parts by weight of methylcellulose, and approximately 0.5 to 15 parts by weight of asbestos fiber.

12. A fire retardant and control composition consisting of an adhering aqueous dispersion of about 8 to 20 pounds per 100 pounds of slurrry of the combination consisting essentially of approximately 80 to 93.5 parts by weight of particulate absorbent calcium silicate having a Gardner-Coleman water absorption of at least 50% by weight, approximately 1.5 to 5 parts by weight of methylcellulose, and approximately 0.5 to 15 parts by weight of asbestos fiber.

13. An improved method of retarding and controlling fires which comprises applying to exposed combustible surfaces an adhering, water retaining, smothering and insulating, blanketing coating of an aqueous slurry of about 8 to 20 pounds per 100 pounds of slurry of the combination consisting essentially of approximately 82 to 94.5 parts by weight of particulate absorbent calcium silicate having a Gardner-Coleman water absorption of at least 50% by weight, approximately 5 to 15 parts by weight of gel-forming bentonite, and approximately 0.5 to 2 parts by weight of methylcellulose.

14. An improved method of retarding and controlling fires which comprises applying to exposed combustible surfaces an adhering, water retaining, smothering and insulating, blanketing coating of an aqueous slurry of about 8 to 20 pounds per 100 pounds of slurry of a combination consisting essentially of approximately 72 to 90.5 parts by weight of particulate absorbent diatomaceaus earth having a Gardner-Coleman water absorption of at least 50% by weight, approximately 5 to 15 parts by weight of gel-forming bentonite, and approximately 0.5 to 2 parts by weight of methylcellulose.

15. An improved method of retarding and controlling fires which comprises applying to exposed combustible surfaces an adhering, water retaining, smothering and insulating, blanketing coating of an aqueous slurry of about 8 to 20 pounds per 100 pounds of slurrry of the combination consisting essentially of approximately 80 to 93.5 parts by weight of particulate absorbent calcium silicate having a Gardner-Coleman water absorption of at least 50% by weight, approximately 1.5 to 5 parts by weight of methylcellulose, and approximately 0.5 to 15 parts by weight of asbestos fiber.

References Cited in the file of this patent

UNITED STATES PATENTS

| | | |
|---|---|---|
| 2,425,768 | Wagner | Aug. 19, 1947 |
| 2,551,919 | Williamson et al. | May 8, 1951 |
| 2,570,947 | Himel et al. | Oct. 9, 1951 |
| 2,618,595 | Gloor | Nov. 18, 1952 |
| 2,687,375 | Fischer et al. | Aug. 24, 1954 |
| 2,857,329 | Fischer et al. | Oct. 21, 1958 |
| 2,858,895 | Connell | Nov. 4, 1958 |
| 2,913,418 | Sohngen et al. | Nov. 17, 1959 |

FOREIGN PATENTS

| | | |
|---|---|---|
| 3,353 | Great Britain | of 1912 |